United States Patent [19]

Bras et al.

[11] Patent Number: 4,744,442
[45] Date of Patent: May 17, 1988

[54] DEVICE FOR SUPPLYING A LUBRICANT

[75] Inventors: Johan C. Bras, Tricht; Antonio Gabelli, Ijsselstein; Emanuel M. de Blic, Le Chesnay, all of Netherlands

[73] Assignee: SKF Industrial Trading and Development Company B.V., Nieuwegein, Netherlands

[21] Appl. No.: 876,528

[22] Filed: Jun. 20, 1986

[30] Foreign Application Priority Data

Jun. 26, 1985 [NL] Netherlands ............... 8501839

[51] Int. Cl.$^4$ ............................................. F16N 11/10
[52] U.S. Cl. ........................................ 184/39; 222/389
[58] Field of Search ............... 184/39, 41, 42; 222/389, 52, 80, 82, 83; 60/649, 673

[56] References Cited

U.S. PATENT DOCUMENTS

| | | | |
|---|---|---|---|
| 1,893,087 | 9/1930 | Kerns | 184/40 |
| 2,852,098 | 11/1955 | Benson | 184/39 |
| 3,842,939 | 10/1974 | Satzinger | 184/39 |
| 4,023,648 | 5/1977 | Orlitzky et al. | 184/39 |

Primary Examiner—Carlton R. Croyle
Assistant Examiner—Leonard P. Walnoha
Attorney, Agent, or Firm—Rosen, Dainow & Jacobs

[57] ABSTRACT

A device for supplying a lubricant comprises a receptacle to contain the lubricant with an opening arranged in the bottom thereof. A piston member is sealingly displaceable along the walls inside the receptacle and located in initial position near the top of the receptacle. At least one extendable or expandable member is supported by the receptacle at the circumference over the lubricant present in the receptacle with a bottom portion located near and above the piston member which member contains an electrolyte. At least one galvanic element is supported over the electrolyte inside the receptacle, and a flexible member and rupturable support are provided for bringing the galvanic element into contact with the electrolyte. The said extendable or expandable member with the electrolyte present therein and the galvanic element form a separate assembly detachable from the receptacle. The receptacle consists of a bottom part open at the top which may contain the lubricant and a cover capable of closing this portion from the top, so that after removal of the cover, the separate assembly may be taken out of the receptacle.

6 Claims, 1 Drawing Sheet

DEVICE FOR SUPPLYING A LUBRICANT

The invention relates to a device for supplying a lubricant, comprising a receptacle to contain the lubricant with an opening arranged in the bottom thereof, a suction member sealingly displaceable along the walls inside the receptacle and located in initial position near the top of the receptacle, at least one extendable or expandable member supported by the receptacle near the circumference over the lubricant present in the receptacle with a bottom portion located near and above the suction member which member contains an electrolyte, at least one galvanic element supported over the electrolyte inside the receptacle, and operating means for bringing the galvanic element into contact with the electrolyte. Such an arrangement is disclosed in U.S. Pat. No. 3,842,939.

A device of this type serves for the automatic continuous supply of a lubricant to a part to be lubricated in a determinate quantity per unit time. For this purpose, the device is connected by the opening present in the bottom of the receptacle to an opening in a housing, for example, in which the part to be lubricated is to be found, whereafter the galvanic element is brought into contact with the electrolyte. A gas is thereby gradually formed, the increasing evolution of gas slowly moves the suction member downward, and the lubricant is forced out of the opening to the part to be lubricated in the housing.

In this prior art device, the receptacle is entirely closed, and the extendable member is fixed in the receptacle along the circumference thereof. The galvanic element is attached to the bottom end of a screw situated inside the receptacle, which screw projects outward through a hole provided in the top of the receptacle, and is provided at the top with a sealing ring sealing off the said opening from the outside when the screw is screwed all the way in to bring the galvanic element into contact with the electrolyte.

The disadvantage of the known device is that it can be used only once. After the lubricant has all been forced out of the receptacle, the entire device with its empty receptacle must be discarded and replaced by a new unit with a full receptacle.

The object of the invention is to provide a device of the said type that is free from that disadvantage.

This object is accomplished in that, in the device according to the invention, the said extendable or expandable member with the electrolyte present therein and the galvanic element form a separate assembly detachable from the receptacle, and the receptacle consists of a bottom part open at the top which may contain the lubricant and a cover capable of closing this portion from the top, so that after removal of the cover, the said assembly may be taken out of the receptacle.

In a device constructed in this way, the receptacle may be used several times over. After the lubricant has been expelled from the receptacle, by removing the cover the assembly of the said expandable member and galvanic element may be removed from the receptacle, whereafter the suction member can be taken out and the receptacle refilled with lubricant. Then the suction member is installed and a new assembly attached, after which, when the cover has been placed on the receptacle, the device is ready for reuse.

Preferably, the means for brining the galvanic element into contact with the electrolyte are likewise included in the said separate assembly.

Because the device according to the invention comprises a removable cover, means for bringing the galvanic element into contact with the electrolyte may be guarded by the cover against unintentional actuation and may advantageously and simply consist of a flexible member surmounting the galvanic element and such supporting means for the galvanic element that by pressing the flexible member in against the galvanic element, this element is free from the supporting means and reaches the electrolyte.

To facilitate the pressing in of the flexible member, an element of a comparatively hard material, for example a ball, may be placed on the flexible member above the galvanic element.

Because the means for bringing the galvanic element into contact with the electrolyte are protected by the cover, a plurality of galvanic elements with their corresponding operating means may be present in a device according to the invention, so that the possibility exists of regulating the quantity of lubricant flowing from the device per unit time by actuating one, two or more galvanic elements by pressing in the corresponding flexible member, in which case an increase in the rate of outflow may take place even with a device already in operation.

It is observed that U.S. Pat. No. 4,023,648 discloses a device of the kind mentioned in the preamble, in which likewise the possibility exists of regulating the rate of outflow of the lubricant. Here, however, one galvanic element is present, consisting of two electrodes being in contact with an electrolyte, so that to activate the galvanic element, the electrodes must be electrically connected to each other. Now this electrical connection is made by way of resistances of various sizes, so that by selecting a certain resistance, a certain rate of outflow of the lubricant is obtained. This known device is comparatively expensive, and moreover can also be used only once.

The invention will be described with reference to the drawing, in which

Figure 1:
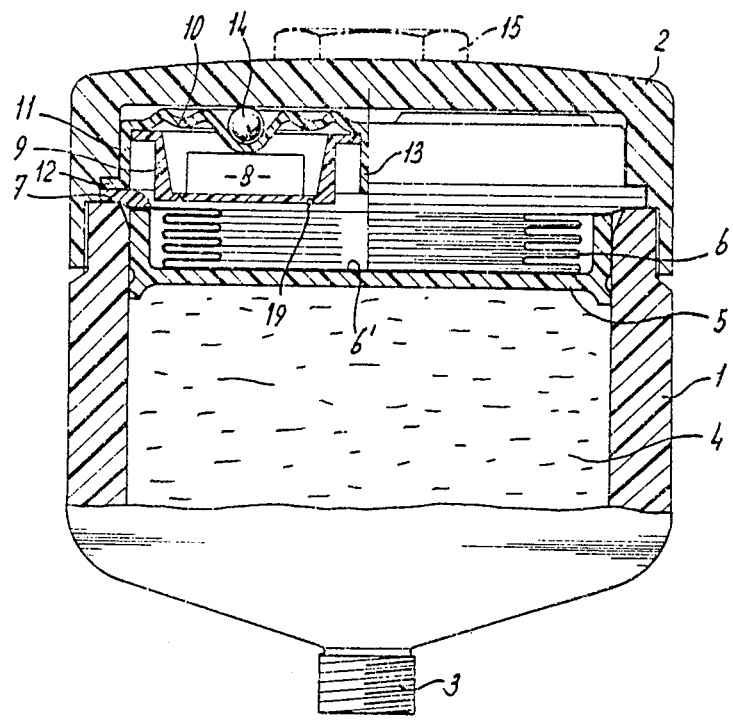
FIG. 1 shows a device according to the invention in cross section.
Figure 2:
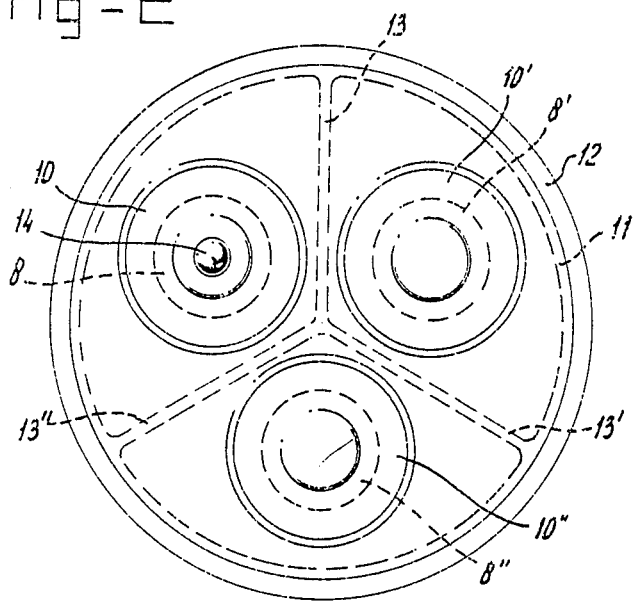
FIG. 2 shows a top view with cover removed.

As indicated in the drawing, the device comprises a receptacle 1 open at the top and a cover 2 capable of being fixed on the receptacle 1. In the bottom of the receptacle 1, there is an opening 3 in the form of a connection fitting. By means of this fitting 3, the device can be fixed in an opening in the housing of the part to be lubricated.

The receptacle 1 is filled with a lubricant 4, a piston member 5 being present over the lubricant.

Above this member 5, there is a separate assembly consisting of an expandable member or bellows 6 resting against the member 5 by its bottom 6', attached along the circumference to a ring 7, and containing an electrolyte, a set of three galvanic elements 8, 8' and 8" each supported by a cupshaped support 9 and flexible members, 10', 10' surmounting these galvanic elements, respectively, which at the circumference pass over into an annular wall 11 with a flange 12 and inward into partitions 13, 13' and 13". This assembly rests by its projecting rim formed by the ring 7 and the flange 12 on the top of the receptacle 1, this rim being secured by the cover 2. Further, a ball 14 is placed on the flexible members 10, 10', 10" above each galvanic element 8.

After the device has been fixed in an opening in a housing of the part to be lubricated by its connection fitting 3, the cover 2 is removed so that the top of the said assembly is exposed. Then, by pressing a ball 14 with the hand, sufficient pressure can be exerted on the underlying galvanic element 8 to break off the bottom of the cup-shaped support 9 supporting that element at its weak point 19, whereby the galvanic element 8 drops into the electrolyte inside the expandable member 6, and the galvanic element is activated. In the same way, the second galvanic element 8' and/or the third 8" may be activated, whereby the rate at which the lubricant 4 is expelled from the receptacle 1 is increased. Even after the device has already been in operation for some time, by removing the cover 2 a second and/or a third galvanic element may be activated.

When the entire quantity of lubricant 4 has been expelled from the receptacle 1, at which time the suction member 5 is near the bottom of the receptacle 1 and the expandable member 6 has been expanded completely, the cover 2 is removed from the receptacle 1 and the assembly of parts 6, 7, 8, 9, 10, 11, 12 and 13 is pulled from the receptacle 1, whereafter the suction member 5 can be taken out of the receptacle and the receptacle can be refilled with lubricant 4. Then the member 5 is replaced and a new said assembly is placed on top of the receptacle 1. One or more of the new galvanic elements may then be activated in the manner described above, whereupon, after placement of the cover 2, the device is once more in operation.

The walls of the receptacle 1 are made of a transparent synthetic material, and the suction member 5 is of a conspicuous color, so that it may be seen at all times in what position the member 5 lies in the receptacle, and consequently how much lubricant 4 is left in the receptacle.

On the top of cover 2, a hexagonal screw head 15 is fixed to facilitate the execution of rotary motions.

We claim:

1. Device for supplying a lubricant, comprising a receptacle to contain the lubricant with an opening arranged in the bottom thereof, a piston member sealingly displaceable along the walls inside the receptacle and located initially near the top of the receptacle, at least one expandable member supported by the receptacle at the circumference over the lubricant present in the receptacle with a bottom portion located near and above the piston member which piston member contains an electrolyte, at least one galvanic element supported over the electrolyte inside the receptacle, and operating means for bringing the galvanic element into contact with the electrolyte, characterized in that said expandable member with the electrolyte present therein, the operating means and the galvanic element form a separate assembly detachable from the receptacle, and the receptacle consists of a bottom part open at the top which may contain the lubricant and a cover capable of closing this portion from the top, so that after removal of the cover, said separate assembly remains within said receptacle.

2. Device for supplying a lubricant, comprising a receptacle to contain the lubricant with an opening arranged in the bottom thereof, a piston member sealingly displaceable along the walls inside the receptacle and located initially near the top of the receptacle, at least one expandable member supported by the receptacle at the circumference over the lubricant present in the receptacle with a bottom portion located near and above the piston member which member contains an electrolyte, at least one galvanic element supported over the electrolyte inside the receptacle, and operating means for bringing the galvanic element into contact with the electrolyte, characterized in that said expandable member (6) with the electrolyte present therein and the galvanic element (8) form a separate assembly detachable from the receptacle (1), and the receptacle consists of a bottom part (1) open at the top which may contain the lubricant (4) and a cover (2) capable of closing this portion from the top, so that after removal of the cover, said separate assembly may be separated from said receptacle, said means bringing the galvanic element into contact with the electrolyte are likewise included in said separate assembly said means for bringing the galvanic element into contact are composed of a flexible member (10) surmounting the galvanic element (8) and such supporting means (9) for the galvanic element (8) that by pressing in the flexible member (10) against the galvanic element, the galvanic element (8) is freed from the supporting means (9) and reaches the electrolyte.

3. Device according to claim 2, characterized in that an element (14) of a comparatively hard material is placed on the flexible member (10) above the galvanic element (8).

4. Device according to claim 3, characterized in that the element (14) is spherical.

5. Device according to claims 2, 3 or 4, characterized in that a plurality of galvanic elements (8, 8', 8") with their corresponding supporting means (9; 10; 14) are arranged in the device, each said galvanic element being selectively subject to contact with said electrolyte.

6. Device for supplying a lubricant, comprising a receptacle to contain the lubricant with an opening arranged in the bottom thereof, a piston member sealingly displaceable along the walls inside the receptacle and located initially near the top of the receptacle, at least one extendable member supported by the receptacle at the circumference over the lubricant present in the receptacle with a bottom portion located near and above the piston member which member contains an electrolyte, at least one galvanic element supported over the electrolyte inside the receptacle, and operating means for bringing the galvanic element into contact with the electrolyte, characterized in that said extendable member with the electrolyte present therein, the operating means and the galvanic element form a separate assembly detachable from receptacle, and the receptacle consists of a bottom part open at the top which may contain the lubricant and a cover capable of closing this portion from the top, so that after removal of the cover, said separate assembly remains within said receptacle.

* * * * *